United States Patent [19]

Fagard

[11] Patent Number: 5,162,785
[45] Date of Patent: Nov. 10, 1992

[54] METHOD AND DEVICES FOR OPTIMIZING THE CONTRAST AND THE ANGLE OF VIEW OF A LIQUID CRYSTAL DISPLAY

[75] Inventor: Pierre Fagard, Montigny le Bretonneux, France

[73] Assignee: Sextant Avionique, France

[21] Appl. No.: 587,124

[22] Filed: Sep. 24, 1990

[30] Foreign Application Priority Data

Sep. 22, 1989 [FR] France .............................. 89 12454

[51] Int. Cl.[5] .............................................. G09G 3/36
[52] U.S. Cl. .................................. 340/784; 340/765; 359/72
[58] Field of Search ............... 340/784, 765, 767, 793, 340/784; 350/331 R, 347 V, 345; 358/169, 161; 359/72, 86

[56] References Cited

U.S. PATENT DOCUMENTS

| | | | |
|---|---|---|---|
| 4,760,389 | 7/1988 | Aoki et al. | 340/784 |
| 4,788,588 | 11/1988 | Tomita | 340/784 |
| 5,012,314 | 4/1991 | Tobita et al. | 340/767 |

FOREIGN PATENT DOCUMENTS

| | | | |
|---|---|---|---|
| 0313331 | 4/1989 | European Pat. Off. | 340/784 |
| 62-34442 | 2/1987 | Japan . | |
| 0290438 | 11/1988 | Japan . | |
| 0006928 | 1/1989 | Japan | 340/784 |
| 0207790 | 2/1989 | Japan | 340/784 |
| 2237400 | 5/1991 | United Kingdom | 340/784 |

*Primary Examiner*—Ulysses Weldon
*Assistant Examiner*—Doon Yue Chow
*Attorney, Agent, or Firm*—William A. Drucker

[57] ABSTRACT

A method is provided for optimizing the contrast and the angle of view of a liquid crystal display, this method consisting in periodically energizing a given zone of the display, permanently measuring the luminance of this zone so as to obtain at all times a pair of values corresponding respectively to the luminance of the zone in the energized state and to the luminance of the zone in the de-energized state, determining the contrast from the values of each of said pairs each of the measured luminance values and adjusting the control voltage of the cell display as a function of the contrast thus defined.

6 Claims, 1 Drawing Sheet

METHOD AND DEVICES FOR OPTIMIZING THE CONTRAST AND THE ANGLE OF VIEW OF A LIQUID CRYSTAL DISPLAY

BACKGROUND OF THE INVENTION

1. Field of the Invention

The invention relates to a method and a device for optimizing the contrast and the angle of view of a liquid crystal display.

It applies more particularly, but not exclusively, to transmissive type liquid crystal displays intended to be observed along a given axis of vision. Such is the case in particular in the instrument panels of vehicles, and in particular of aircraft.

2. Description of the Prior Art

At the present time, numerous displays of this kind are equipped with means for adjusting the contrast, such adjustment being made at the beginning of a phase of use of the display and not being modified during this phase.

Now, it proves that for multiple reasons this method of adjustment does not allow optimum contrast to be obtained durably for the desired angle of vision.

First of all, it has been observed that, when he makes the adjustment, the operator is rarely in the position of use, so that the adjustment made is not optimum.

Furthermore, once the adjustment has been made, the contrast frequently varies for multiple reasons such for example as a variation of the temperature of the liquid crystal which is difficult to compensate for by temperature controlling the control voltage of the LCD. Moreover, variations of the threshold voltage of crystals from different suppliers, make this type of adjustment necessary.

It has also been proposed to adjust the liquid crystal cell so as to maintain the luminance of the light signals transmitted in a test zone substantially constant. However, such adjustment which is described in the "Patent Abstracts of Japan" vol 9, no. 62 (page 342) (1785), 19th May 1985, does not provide a contrast control.

SUMMARY OF THE INVENTION

The purpose of the invention is then particularly to overcome these drawbacks.

For this, it provides a method of optimizing the contrast and the angle of view of a liquid crystal display, this method comprising the following phases:

- periodic excitation of a given zone of the display so as to cause it to pass successively from the energized "ON" state to the de-energized or "OFF" state, then again to the energized "ON" state and so on;

- permanent measurement of the luminance of said zone; and adjustment of the control voltage of the liquid crystal cell of the display as a function of the detected luminance.

According to the invention, this method is characterized in that:

- the periodic excitation of said zone is effected so as to be able to discern the luminances of each successive energized state, de-energized state pair;

- the measurement phase is carried out so as to obtain at all times a pair of values corresponding respectively to the luminance of the zone in the energized state and to the luminance of the zone in the de-energized state;

- an additional phase is provided for determining the contrast from the luminance values of each of said pairs;

adjustment of the control voltage of the liquid crystal cell of the display is made as a function of the previously determined contrast.

Of course, determination of the control voltage as a function of the determined contrast may be carried out in multiple ways.

Thus, for example, the contrast value determined at a time t may be subtracted from the contrast value determined at the preceding time t−1 and the value of the control voltage may be increased or possibly decreased as a function of the sign of this subtraction.

BRIEF DESCRIPTION OF THE DRAWINGS

Of course, the invention relates also to a device for implementing the above defined method, one embodiment of which will be described hereafter by way of non limitative example, with reference to the accompanying drawings in which.

DESCRIPTION OF A PREFERRED EMBODIMENT

Figure 1:
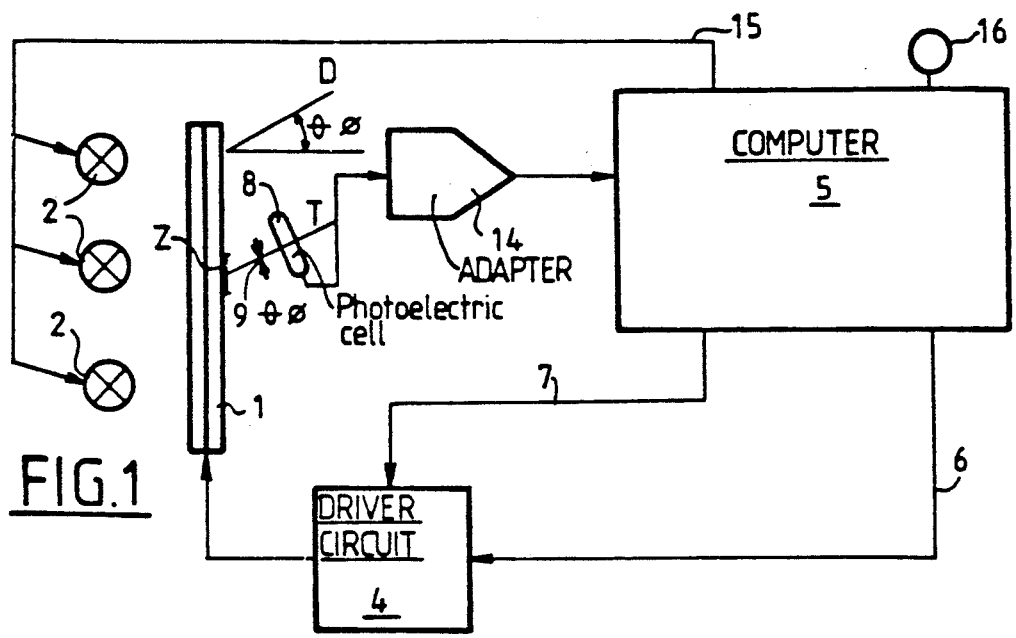
FIG. 1 is a block diagram of a display equipped with this device.

As mentioned above, the display according to the invention operates in transmissive mode and comprises, as shown in FIG. 1, a liquid crystal cell 1 illuminated on one side by a light device 2 and which is intended to be observed on the other side along a preferential axis of vision D forming angles $\theta_1$ and $\phi_1$ with the normal to the plane of the cell.

This liquid crystal cell is controlled by a driver circuit of conventional type 4 adapted to apply a given control voltage $V_{LCD}$ to selected electrodes of cell 1, selection of the electrodes, and consequently of the pixels of the image to be formed, being made by a computer (connection 6). In this example, the control circuit 4 comprises means for adjusting the control voltage which it delivers. However, contrary to existing circuits, these adjustment means do not comprise a potentiometer which can be operated by the user but are controlled by computer 5 (connection 7).

In accordance with the invention, computer 5 is adapted so as to apply a voltage to the electrodes of cell 1 included in a given test zone Z, which causes periodic energization of the pixels included in this zone, which then pass successively from the energized "ON" state to the de-energized "OFF" state, then again to the "ON" state and so on.

The light transmitted in this zone Z of the display is detected by a collimated photoelectric cell 8 (lens 9) oriented so as to be able to "observe" this zone along a given axis T parallel to the preferential axis of vision D.

Figure 2:
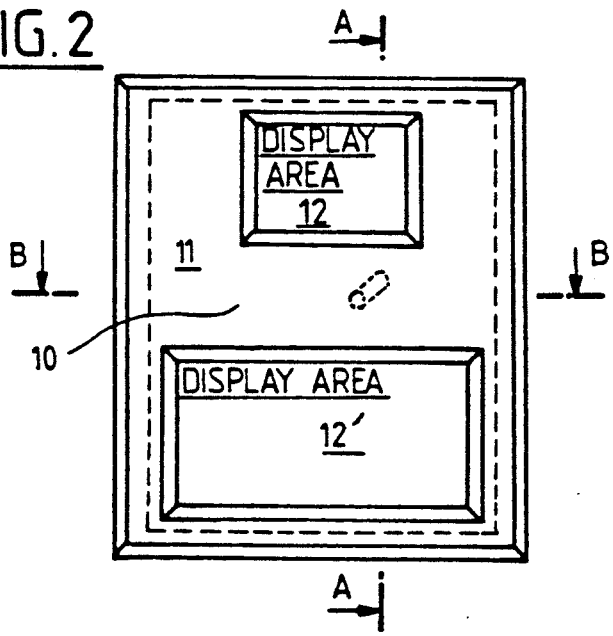
FIG. 2 is a front view of a display panel usable in the device shown in FIG. 1.
Figure 3:
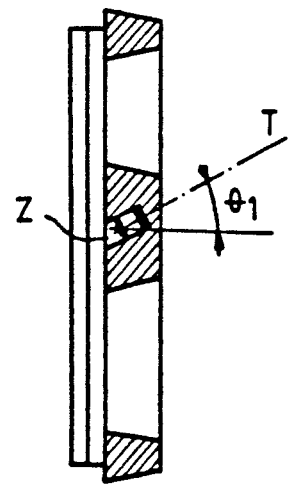
FIGS. 3 and 4 are schematic sections respectively through A—A (FIG. 3) and B—B (FIG. 4) of the display panel shown in FIG. 2.
Figure 4:
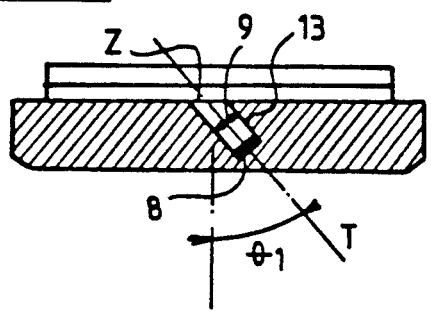

This cell, as well as the zone of the display are protected from ambient light by an optical mask which, in the example shown in FIGS. 2 to 4, consists in the cross piece 10 of a grid 11 applied against the front face of the liquid crystal cell 1 and which divides the latter into two display areas 12, 12'. Cell 8 is here disposed at the bottom of a well 13 formed in cross piece 10 coaxially to axis T. Its opening, which is applied against the cell, defines the test zone Z.

Of course, the invention is not limited to such an arrangement. Thus, the photoelectric cell 8 and the optical system 9 which is associated therewith could be mounted in a device with variable orientation (for example by means of a ball joint) so that the user may adjust its orientation at his convenience.

The signal generated by cell 8, which consists of an alternating succession of values representative of the luminances of cell 1 in the energized state (i.e. L ON) and in the de-energized state (i.e. L OFF), is transmitted to computer 5, after shaping in an adapter 14.

This computer 5 is adapted so as to work out the quotient of the consecutive values L ON, L OFF of each pair, so as to be able to obtain at all times a value C representative of the contrast $$\left( C = \frac{L\ ON}{L\ OFF} \right)$$

These contrast values are analyzed by computer 5 which causes the adjustment of the liquid crystal cell 1 to evolve so as to obtain maximum contrast in the preferential direction D. Similarly, grey levels may be taken into account and controlled simply.

Such as described, this device has the advantage of being independent:
- of threshold voltage variations of the crystal,
- of the ambient temperature, and
- of the usual adjustments on this type of display.

It further makes possible permanent self-testing of the display + lighting module assembly. In this case, it may possibly comprise means for generating an alarm signal when the value representative of the contrast is substantially equal to 1 or indeterminate after exploration of the whole possible control voltage range of the LCD.

Furthermore, computer 5 provides power control (via connection 15) of the lighting module 2 as a function of external reference information (coming for example from a control button 16), consequently the luminosity measurement made by cell 8 makes it possible to check the correlation between the light power controlled by computer 5 and the luminance effectively measured by the cell through the display.

Of course, the invention is not limited to the above described embodiment. Thus, the liquid crystal cell could be of the reflective or translective type. In this case, the optoelectronic detection assembly will be disposed in a position removed from the display.

What is claimed is:

1. A method of optimizing the contrast of a liquid crystal display controlled by a control voltage, in a determined angle of view, said method comprising the following phases of:

i) energizing periodically a given zone of the liquid crystal display so as to cause it to pass successively from an energized "ON" state to a de-energized "OFF" state, then again to the energized "ON" state and so on;
    ii) measuring the luminance of said zone in said determined angle of view in each successive "ON" state"OFF" state pair, so as to obtain successive pairs of "ON"-"OFF" luminance values;
    iii) calculating a contrast value from each of said pairs of "ON"-"OFF" luminance values;
    iv. calculating a difference value between the contrast value determined at a time t and that determined at time t−1 and adjusting the control voltage of the liquid crystal display as a function of said difference value.

2. The method as claimed in claim 1, which further provides permanent self-testing of the liquid crystal display.

3. The method as claimed in claim 2, which further comprises a phase of emitting an alarm signal when the contrast value is substantially equal to 1.

4. A device for optimizing the contrast of a transmissive type liquid crystal display provided with a plurality of electrodes, each defining a pixel, said device comprising:

a control circuit adapted for applying to a determined number of said electrodes included in a given test zone of the liquid crystal display, a voltage causing periodic energization and de-energization of said determined number of electrodes,
    a photoelectric cell placed opposite said test zone so as to deliver a luminance signal having successive pairs of ON-OFF values corresponding to successive energized, de-energized states of said test zone,
    means for collimating and orienting the cell along a give axis which may correspond to a preferential axis of vision,
    a computer which receives said luminance signal and which calculates a contrast value at all times from said ON-OFF values of said successive pairs, said computer further calculating a difference value between a contrast value determined at a time t and that determined at a time t−1,
    adjusting means which act on the liquid crystal display as a function of said difference value, so as to obtain mamximum contrast.

5. The device as claimed in claim 4, wherein said photoelectric cell is disposed at the bottom of a well whose opening, applied against the liquid crystal display defines the test zone.

6. The device as claimed in claim 4, wherein the photoelectric cell and the collimating means are mounted in a variable orientation device, adjustable by the user.

* * * * *